United States Patent
Qi

(10) Patent No.: US 10,095,215 B2
(45) Date of Patent: Oct. 9, 2018

(54) THERMAL DISPLACEMENT CORRECTION APPARATUS FOR MACHINE TOOL

(71) Applicant: FANUC Corporation, Yamanashi (JP)

(72) Inventor: Xiaoguang Qi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 206 days.

(21) Appl. No.: 15/010,555

(22) Filed: Jan. 29, 2016

(65) Prior Publication Data

US 2016/0224010 A1 Aug. 4, 2016

(30) Foreign Application Priority Data

Jan. 30, 2015 (JP) ................................. 2015-016670

(51) Int. Cl.
*G05B 19/404* (2006.01)
*G05B 19/402* (2006.01)

(52) U.S. Cl.
CPC .......... *G05B 19/404* (2013.01); *G05B 19/402* (2013.01); *G05B 2219/49219* (2013.01)

(58) Field of Classification Search
CPC ............ G05B 2219/49207; G05B 2219/49219
See application file for complete search history.

(56) References Cited

U.S. PATENT DOCUMENTS

| 2002/0004688 | A1 | 1/2002 | Kojima et al. | |
| 2002/0038189 | A1* | 3/2002 | Mizuguchi | B23Q 15/18 |
| | | | | 702/94 |
| 2004/0066831 | A1* | 4/2004 | Shivaswamy | G01B 5/0014 |
| | | | | 374/55 |
| 2006/0089745 | A1 | 4/2006 | Suzuki et al. | |
| 2011/0232120 | A1 | 9/2011 | Tullmann et al. | |
| 2013/0190921 | A1* | 7/2013 | Maekawa | B23Q 11/0007 |
| | | | | 700/177 |

(Continued)

FOREIGN PATENT DOCUMENTS

| CN | 1762655 A | 4/2006 |
| CN | 102133720 A | 7/2011 |
| CN | 103926874 A | 7/2014 |

(Continued)

OTHER PUBLICATIONS

Office Action in DE Application No. 102016101076.6, dated Mar. 20, 2018, 8pp.

(Continued)

*Primary Examiner* — Raj R Gupta
(74) *Attorney, Agent, or Firm* — Hauptman Ham, LLP

(57) ABSTRACT

A thermal displacement correction apparatus for a machine tool first determines the coefficient k in E=a+k|F| where F is a thermal displacement correction amount and E is an adjustment value (first step). Next, in actual processing, a is set if a has not been set yet (second step). After a and the coefficient k are determined in advance, thermal displacement correction unit is enabled and an operation of a machining program is started. The thermal displacement correction amount F is calculated, the adjustment value E is calculated based on E=a+k|F|, a thermal displacement correction amount F' after adjustment (=E×F) is calculated, and F' is sent to the thermal displacement correction unit.

5 Claims, 6 Drawing Sheets

(56) References Cited

U.S. PATENT DOCUMENTS

2014/0074299 A1*  3/2014  Endou .................... G05B 13/02
                                                    700/275
2014/0379117 A1   12/2014  Nishimura

FOREIGN PATENT DOCUMENTS

| CN | 104227498 A | 12/2014 |
| DE | 4028006 A1 | 3/1992 |
| DE | 102007004971 A1 | 8/2008 |
| DE | 102009026484 A1 | 12/2010 |
| DE | 102010003303 A1 | 9/2011 |
| JP | 11-90780 A | 4/1999 |
| JP | H11-90779 A | 4/1999 |
| JP | 2001-239438 A | 9/2001 |
| JP | 2002-018677 A | 1/2002 |
| JP | 3292454 B2 | 6/2002 |
| JP | 3405965 B2 | 5/2003 |

OTHER PUBLICATIONS

Office Action in CN Application No. 201610069007.8, dated Oct. 18, 2017, 13pp.
Decision to Grant a Patent in JP Patent Application No. 2015-016670, dated Oct. 18, 2016.

* cited by examiner

FIG.6

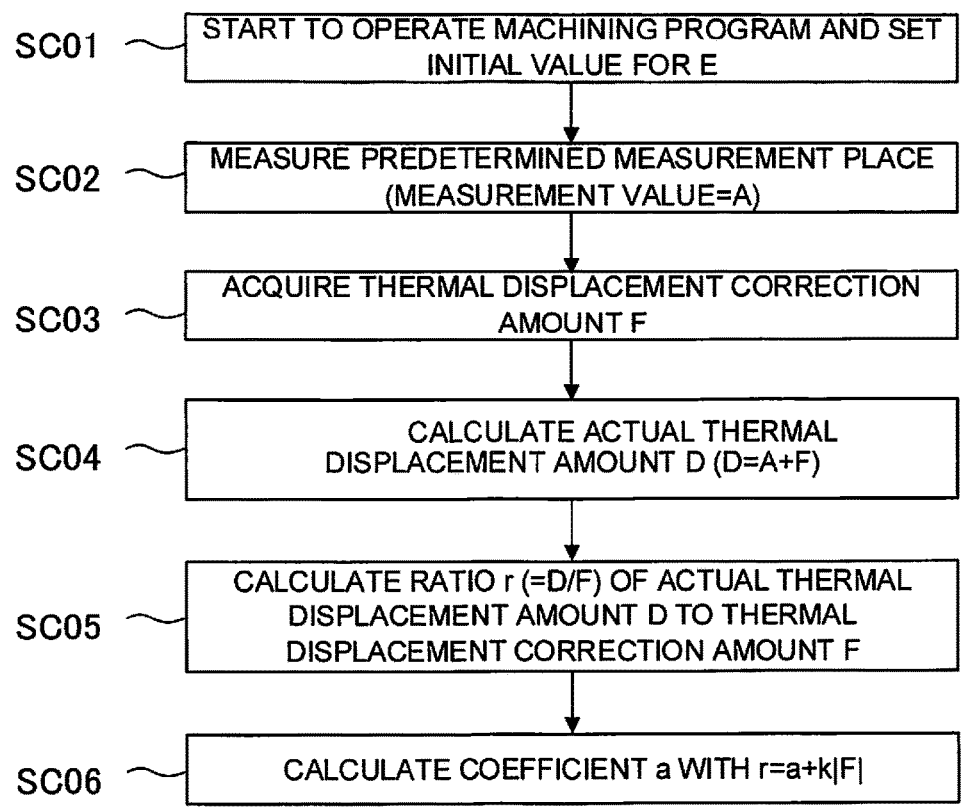

FLOWCHART OF SECOND STEP

SC01 — START TO OPERATE MACHINING PROGRAM AND SET INITIAL VALUE FOR E

SC02 — MEASURE PREDETERMINED MEASUREMENT PLACE (MEASUREMENT VALUE=A)

SC03 — ACQUIRE THERMAL DISPLACEMENT CORRECTION AMOUNT F

SC04 — CALCULATE ACTUAL THERMAL DISPLACEMENT AMOUNT D (D=A+F)

SC05 — CALCULATE RATIO r (=D/F) OF ACTUAL THERMAL DISPLACEMENT AMOUNT D TO THERMAL DISPLACEMENT CORRECTION AMOUNT F

SC06 — CALCULATE COEFFICIENT a WITH r=a+k|F|

THERMAL DISPLACEMENT CORRECTION APPARATUS FOR MACHINE TOOL

RELATED APPLICATIONS

The present application claims priority to Japanese Application Number 2015-016670, filed Jan 30, 2015, the disclosure of which is hereby incorporated by reference herein in its entirety.

BACKGROUND OF THE INVENTION

1. Field of the Invention

The present invention relates to a thermal displacement correction apparatus that is equipped in a machine tool and corrects a thermal displacement amount arising in the machine tool.

2. Description of the Related Art

In a machine tool, since feed screws and a main spindle are driven by motors, the main spindle and the feed screws expand to cause their displacements in machine positions due to heat generated from the motors, frictional heat caused by rotation of bearings, and frictional heat in engagement parts of ball screws and ball nuts of the feed screws. That is, a displacement arises in a relative positional relation between a workpiece and a tool which are to be positioned. This variation in machine positions due to the heat is problematic when performing high-precision processing.

As a method for removing this displacement in machine position due to the heat, there have been conventionally adopted methods of providing a cooling apparatus, configuring a structure in which the ball screw of the feed screw is given initial tension so as not to be affected by the expansion due to the heat, and providing a displacement sensor or a temperature sensor and correcting a command position on the basis of a detected displacement or a detected temperature.

In correction where a thermal displacement amount is calculated from an operation of the machine tool, temperatures of respective parts of the machine tool, and the like, there can be a case where the thermal displacement amount cannot be correctly calculated, which causes a large difference (correction error) between a thermal displacement correction amount and an actual thermal displacement amount and leads to incorrect correction. In such a case, the thermal displacement correction amount is typically increased or decreased for adjustment to improve correction precision.

Prior art technique regarding adjustment of thermal displacement correction amount is disclosed, for example in Japanese Patent Application Laid-Open No. 11-90779, in which an actual displacement amount is measured using a measurement device when performing machining, and the actual displacement amount measured is compared with the thermal displacement correction amount to obtain an adjustment value, and the adjustment value thus obtained is added to, or subtracted from, the thermal displacement correction amount which is calculated, thereby changing and adjusting the thermal displacement correction amount.

The aforementioned adjustment of the thermal displacement correction amount disclosed in Japanese Patent Application Laid-Open No. 11-90779 requires measurement of the actual displacement amount at a machining point when adjusting the thermal displacement correction amount, which is burdensome. Moreover, although this technology provides a corresponding relation between the maximum displacement amount and the average movement distance, in some cases, the corresponding relation may take a large deviation depending on a machine property or machining environment.

In the conventional method, an adjustment value for adjusting thermal displacement correction value is constant value after it is set in advance or an actual displacement amount is measured. After that, in some cases, the adjustment value has to be changed depending on an external environment or a machining situation. In this case, it is sometimes necessary to carry out a plurality of times of manual setting or measurement with machining cycle suspended, for matching the thermal displacement correction amount to the actual displacement amount.

FIG. 8 is a diagram for explaining the conventional art.

"Corresponding Relevant Data between Thermal Displacement Amount and Main Spindle Movement" in (1) shows that corresponding relevant data between the thermal displacement amount and the rotation movement amount of main spindle in the machine is obtained by preliminarily performing a thermal displacement experiment, and the data thus obtained is stored in the machine (more specifically, stored in a memory of a numerical controller that controls the machine). With the conventional art which is disclosed in Japanese Patent Application Laid-Open No. 11-90779 above, however, the relevant data regarding the thermal displacement experiment cannot be changed by a user of the machine, and furthermore, the data is applicable only to the specified machine and main spindle.

"actual measurement" in (2) shows that, when there is a difference between the correction value (obtained by multiplying the thermal displacement correction amount by the adjustment value) and the actual displacement value which exceeds a predetermined level, it is necessary to carry out a plurality of times of actual measurement to change the adjustment value for correcting the correction value.

FIG. 9 is a diagram for explaining that, for changing the adjustment value depending on the external environment or machining situation in the conventional art, it is necessary to suspend the machining cycle to carry out measurement.

FIG. 9 illustrates two times of measurement performed at the time points of measurement 1 and measurement 2. At the time point of measurement 1, since there is a large difference between the thermal displacement correction amount and the actual displacement amount, the adjustment value is changed. Likewise, at the time point of measurement 2, since there is a large difference between the thermal displacement correction amount and the actual displacement amount, the adjustment value is changed again. In the conventional art, the adjustment value is set to a constant numerical value after the measurement. Hence, for improving precision in correcting the thermal displacement amount, it is necessary to carry out measurement again to change an adjustment amount for adjusting the thermal displacement amount to an appropriate value, which problematically causes the machining cycle to be suspended for measurement.

SUMMARY OF THE INVENTION

Therefore, an object of the present invention is to provide a thermal displacement correction apparatus for a machine tool which can perform appropriate adjustment in less measurement times in real time, reducing deviation even though not performing re-measurement and allowing frequencies of suspension of cycle due to measurement to be decreased, when there is a large difference between a thermal displacement correction amount and an actual displacement amount.

According to the present invention, a conversion coefficient is set in advance or set after carrying out measurement once, and an adjustment value can be automatically changed according to change in machining situation. Hence, frequencies of suspension of machining cycle can be reduced.

The present invention is to obtain an actual thermal displacement amount from a thermal displacement correction amount calculated using any conventional method and a measurement value obtained by measuring a predetermined place, and calculate an appropriate adjustment value to correctly adjust the thermal displacement correction amount.

For the calculation of the adjustment value, a relevant function (approximate expression) between the thermal displacement correction amount and the adjustment value is obtained based on information on the thermal displacement correction amount calculated by any known method and the actual displacement amount. The adjustment value is changed based on the relevant function (approximate expression) from a change in thermal displacement correction amount. Specifically, this is performed in two steps mentioned later.

There is provided a thermal displacement correction apparatus for a machine tool according to the present invention, including: a thermal displacement correction unit that estimates a thermal displacement amount from an operation of a machine or a temperature of each portion of the machine and calculates a thermal displacement correction amount for correcting thermal displacement by adding, to a position command value of a feed axis, the thermal displacement correction amount for cancelling the thermal displacement amount thus estimated; and a thermal displacement correction amount adjustment unit that acquires information of an actual position in the machine by a measurement unit and adjusts the thermal displacement correction amount with an adjustment value, the apparatus further comprising: a machine-dependent coefficient calculation unit that calculates a machine-dependent coefficient for calculating the adjustment value on the basis of the thermal displacement correction amount that has been calculated in driving the machine, the actual position in the machine that is measured by the measurement unit, and an approximate expression representing a relation between the thermal displacement amount and the adjustment value; a machining condition-dependent coefficient calculation unit that calculates a machining condition-dependent coefficient for calculating the adjustment value on the basis of the thermal displacement correction amount that has been estimated in machining a workpiece on the basis of a machining program, the actual position in the machine that is acquired by measurement by the measurement unit, and the approximate expression representing the relation between the thermal displacement amount and the adjustment value; and a calculation unit that calculates the adjustment value corresponding to the estimated thermal displacement amount, from the approximate expression, wherein the thermal displacement correction amount adjustment unit corrects the thermal displacement correction amount with the adjustment value calculated by the calculation unit.

The approximate expression may be preliminarily stored in the machine on the basis of machining experiment data.

The approximate expression can be obtained based on an expression, $E=a+k|F|$, where E is the adjustment value, a is the machining condition-dependent coefficient, k is the machine-dependent coefficient and F is the thermal displacement correction amount.

According to the present invention, appropriate adjustment can be performed in less measurement times in real time. In case of a conventional art, it is necessary to carry out measurement again if there is a large difference between the thermal displacement correction amount obtained after measurement and the actual displacement amount. However, in the case of the present invention, it is possible to decrease frequencies of suspension of cycle due to the measurement.

BRIEF DESCRIPTION OF THE DRAWINGS

The aforementioned and other objects and features of the present invention will be apparent from the following description of embodiments with reference to the appended drawings in which:

FIG. 6 is a flowchart of a second step;

DETAILED DESCRIPTION OF THE PREFERRED EMBODIMENTS

Figure 1:
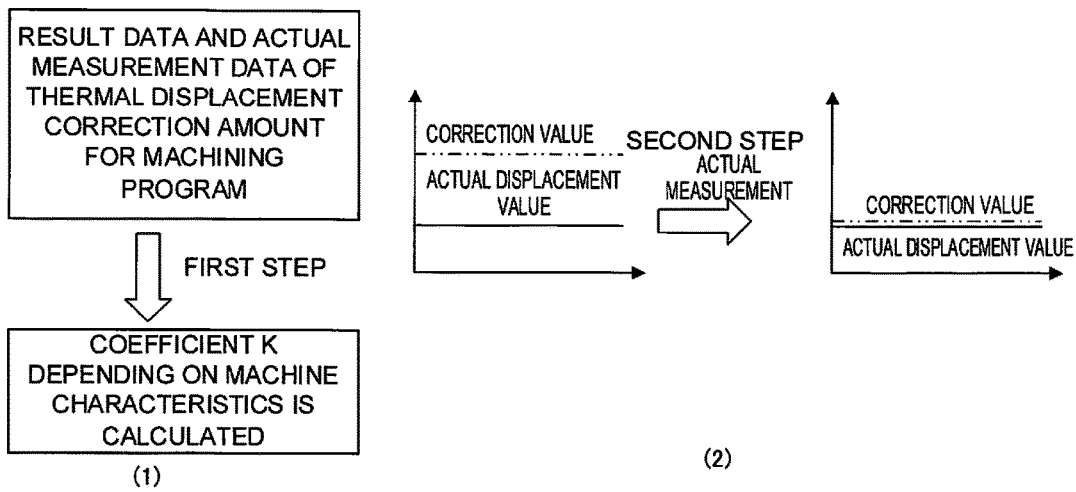
FIG. 1 is a diagram for explaining the present invention.
Figure 2:
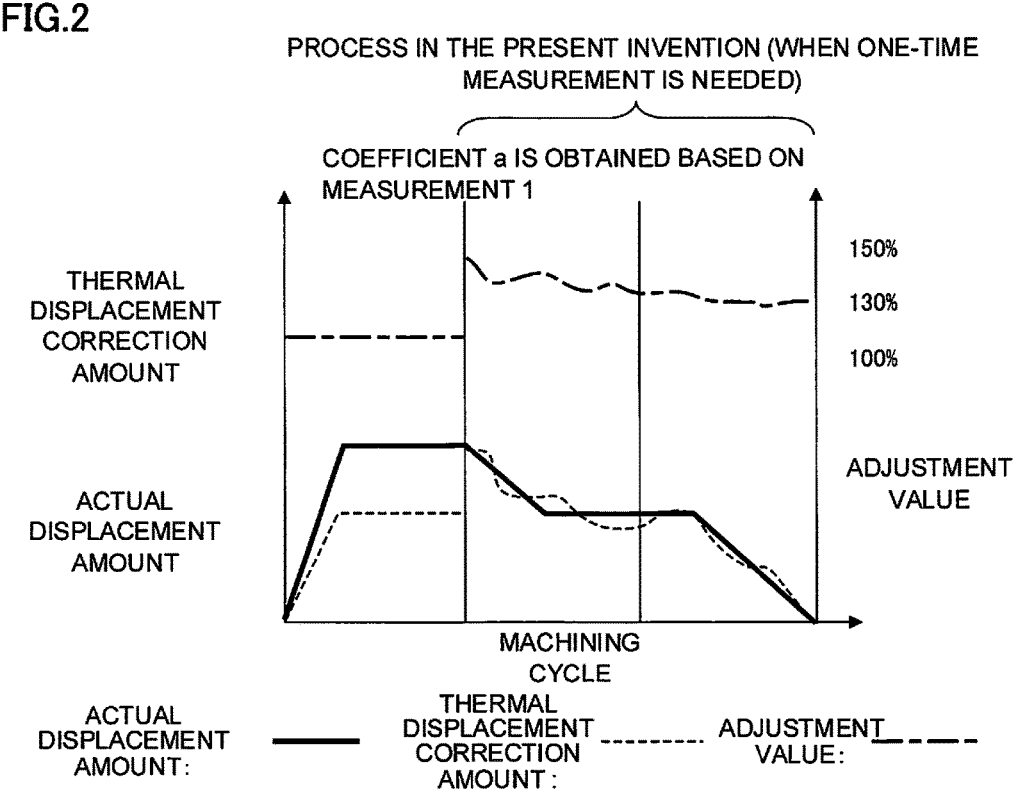
FIG. 2 is a diagram for explaining that an adjustment value, which is added to, or subtracted from, the thermal displacement correction amount, is changed in real time in the present invention.
Figure 3:
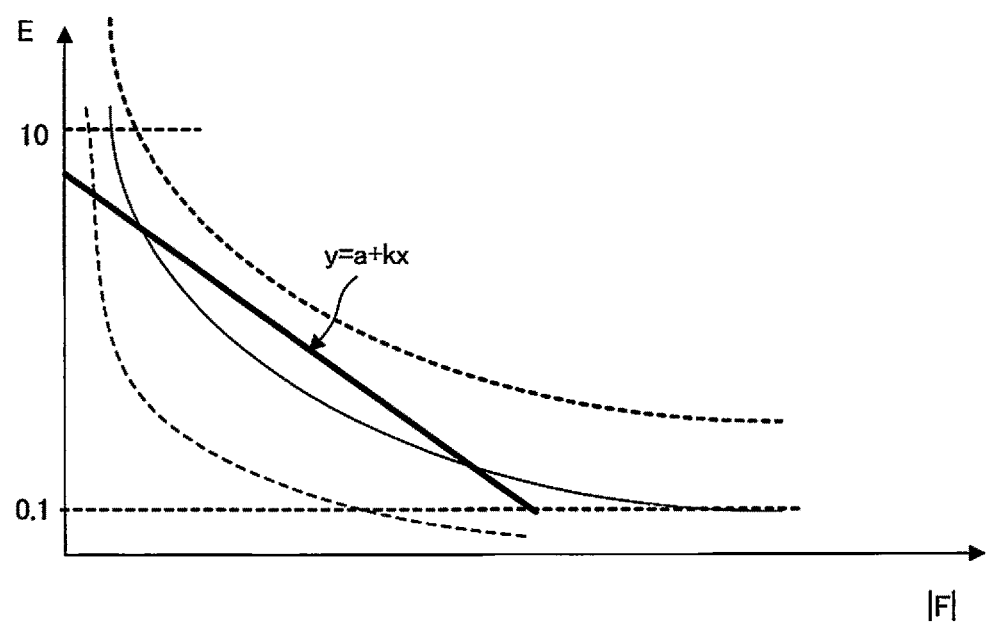
FIG. 3 is a diagram for explaining a principle of the present invention.

FIG. 1 is a diagram for explaining the present invention. FIG. 2 is a diagram for explaining that an adjustment value, which is added to, or subtracted from, the thermal displacement correction amount, is changed in real time in the present invention. FIG. 3 is a diagram for explaining the principle of the present invention.

(1) Since the first step depends on the specifications of the machine (the structure of the machine, the control unit thereof, and the like), this step only has to be performed once in principle as long as the specifications of the machine remains unchanged. Accordingly, when a manufacturer of the machine tool preliminarily performs the first step to determine and store its conversion coefficient k in a memory, a user does not have to perform this step.

Describing a machining program, a program that covers a range within which a thermal displacement amount of the machine can possibly arise is selected. In other words, operation of a machining program is started in a state where thermal displacement does not arise in the machine and then such a machining program is selected as causes a thermal displacement amount to the maximum extent and to the minimum extent in each operation direction of the machine in a state where the thermal displacement amount becomes stable.

(2) When a machining environment (machining situation) is changed, it is necessary for the second step to be performed so that measurement is performed at least one time. After that, the adjustment value is changed in real time and the adjustment value thus changed is reflected on correction. Actual measurement is performed as the difference between the correction value (value obtained by multiplying the thermal displacement correction amount by the adjustment value) and an actual displacement value becomes large. The adjustment value is changed through the actual measurement, and thereby, the correction value is corrected.

According to the present invention, with the function of a controller of the machine tool, which estimates a thermal displacement amount and performs a thermal displacement correction, the relation between the thermal displacement correction amount and the actual thermal displacement amount can be comprehended to obtain the appropriate adjustment value at all times in less measurement times.

There are relations in the following expression (1) and expression (2), which is its variation, between a thermal displacement correction amounts F, an actual thermal displacement amounts D and an adjustment values E, which are obtained from actual operation under selection of a plurality of machining programs. It should be noted here that the thermal displacement correction amount F and the actual thermal displacement amount D can take positive or negative values depending on the way of determining a position used as the reference in measuring these amounts.

$$E \times F = D \tag{1}$$

$$E = D/F \ (F \neq 0; D \text{ and } F \text{ have the same signs}) \tag{2}$$

Herein, assumptions are made as follows.

Assumption 1: D is a constant, and in other words, the aforementioned function is displayed as a graph. The actual thermal displacement amount D is constant for a short period of time.

Assumption 2: E is calculated within a range from the minimum value to the maximum value of E (Emin to Emax). A typical adjustment value takes Emin=0.01 and is presumed to take Emax=10 as its limit.

Within the aforementioned calculation range of E, the following approximate function $$y = a + kx \tag{3}$$

is obtained in the least-squares method. In other words, $$E = a + k|F| \tag{4}$$

is obtained.

Furthermore, even when D changes (in the case where the curve or curvature of the broken line changes), the value of k in the aforementioned approximate function does not change much. Due to this, in machining, the value of k is typically almost constant with respect to both the maximum value and the minimum value of the actual thermal displacement amount D. Incidentally, a in expression (4) is a numerical value specified depending on the machining program.

Figure 4:
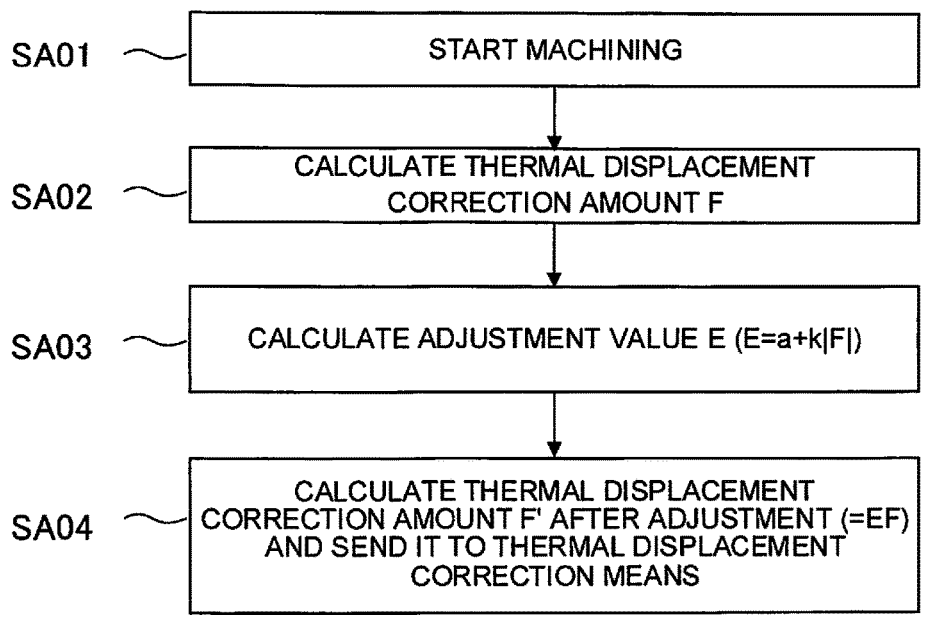
FIG. 4 is an overall flowchart of a process according to the present invention.

FIG. 4 is an overall flowchart according to the present invention.

First, a "first step" mentioned later is performed to determine the coefficient k in expression (4), E=a+k|F|. Since the coefficient k depends on the specifications of the machine (the structure of the machine, the control unit thereof, and the like), the aforementioned "first step" only has to be performed once in principle as long as the specifications of the machine remain unchanged. Accordingly, if a manufacturer of the machine tool preliminarily performs the first step to determine and store the coefficient k in a memory of the numerical controller that controls the machine tool, a user does not have to perform this step.

Next, in case where the coefficient a has not been set in actual processing, "second step" mentioned later is performed so that the coefficient a is set. With regard to the same machining program, the coefficient a does not have to be recalculated.

After the coefficients k and a are determined in advance, adjustment of the thermal displacement correction is performed according to the following procedure.

Hereafter, the processing is now explained according to respective steps with reference to the flowchart of FIG. 4.

(Step SA01)

Thermal displacement correction means is enabled to start operation of the machining program. As the thermal displacement correction means, conventionally known one can be used.

(Step SA02) The thermal displacement correction amount F is calculated. As a method for calculating the thermal displacement correction amount F, a conventionally known method can be used.

(Step SA03)

The adjustment value E is calculated using expression (4), E=a+k|F|, mentioned above.

(Step SA04)

A thermal displacement correction amount F' after adjustment is calculated using expression (5) below, $$F' = E \times F \tag{5}$$

and the calculation result is sent to the thermal displacement correction means.

Figure 5:
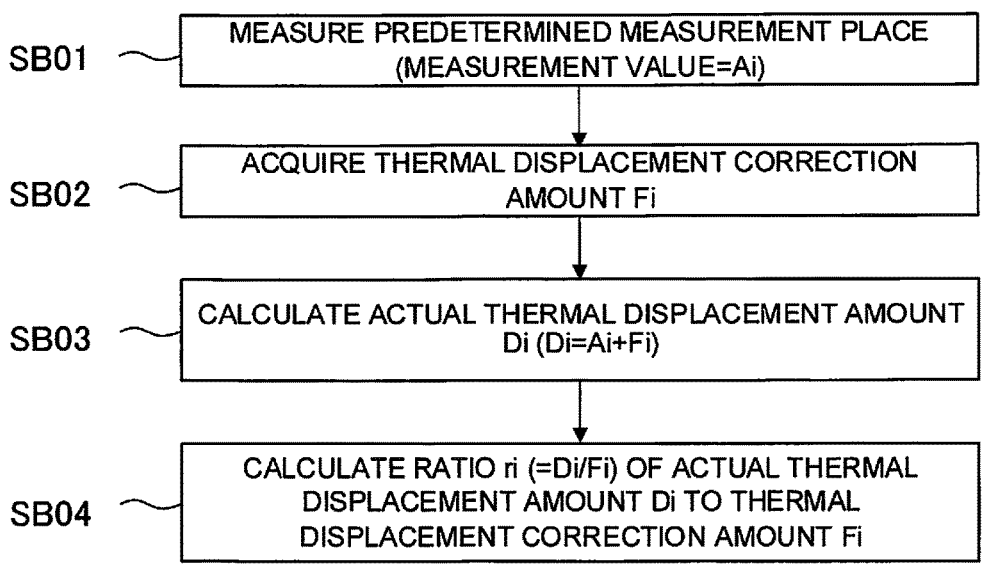
FIG. 5 is a flowchart of a first step.

FIG. 5 is a flowchart of the first step. Machining programs are preliminarily prepared, and the conversion coefficient k is obtained for each machining program according to the following procedure. With the thermal displacement correction means enabled, operation of a machining program is started in a state where a thermal displacement does not arise (or state of being sufficiently left in a stopped state) and the following procedure is performed. As the thermal displacement correction means, known one can be used. Moreover, the number of times and the time interval the following procedure is executed are determined in advance.

Hereafter, the processing is explained according to respective steps with reference to the flowchart of FIG. 5.

(Step SB01)

An actual displacement value at a measurement place predetermined in the machine is measured, and the value thus measured is stored as Ai (i denotes the iteration number (i=1, 2, 3, . . . ; the same applies hereafter). The measurement of the displacement value may be performed in any method. As mentioned above, Ai is a value measured in the state where the thermal displacement correction means is enabled.

(Step SB02)

The thermal displacement correction amount is stored as Fi.

(Step SB03)

The actual thermal displacement amount Di is calculated from the measurement value Ai which is actually measured and the thermal displacement correction amount Fi using the expression, Di=Ai+Fi. To speak strictly, the actual thermal displacement amount Di corresponds to a thermal displacement amount in a state where the correction function is disenabled.

(Step SB04)

The ratio ri (=Di/Fi) of the actual thermal displacement amount Di to the thermal displacement correction amount Fi is calculated. It should be noted that the process is skipped when Fi=0.

After the aforementioned processes are performed in a predetermined number of times, the function y=a+kx is obtained from the ratios ri (=Di/Fi) and the thermal displacement correction amounts Fi in the least-squares method. In this stage, it is desirable that data in which ri<0 be excluded. The aforementioned processes are applied similarly to the other machining programs to obtain the function y=a+kx. The average value of the coefficients k in the functions y=a+kx thus obtained is calculated, and is newly set to be k. Moreover, to obtain the coefficient a, the actual thermal displacement amount is measured at the predetermined measurement place in operating the machining program. When the coefficient a has been already obtained for the same machining program in the same machining environment, the second step do not have to be performed.

Herein, more specific description is made using two machining programs O0001 and O0002. It is supposed that the cycle time of each machining program is approximately 30 minutes.

(1) The machining program O0001 is operated from the state where the machine is stopped. The thermal displacement correction function is enabled and the measurement is performed every minute.

(2) The measurement results A1 to A30 are acquired through measurements and the thermal displacement correction values F1 to F30 are acquired through the correction function. D1 to D30 are calculated using the expression, Di=Ai+Fi.

(3) With the expression, ri=Di/Fi, r1 to r30 are calculated. Then, the plot (ri, |Fi|) (i=1, 2, . . . , 30) of r1 to r30 and |F1| to |F30| is created. It should be noted that data in which ri<0 are excluded.

(4) In the least-squares method, y=a+k1xx is obtained from the aforementioned plots.

(5) The machine is stopped.

(6) The machining program O0002 is operated from the state where the machine is stopped, and the procedure of step (1) to step (4) is performed to obtain y=a+k2×x.

(7) The coefficient k of this machine is determined to be k=(k1+k2)/2, where the value k is an average value of the coefficients obtained by performing the respective machining programs.

FIG. 6 is a flowchart of the second step.

Hereafter, the processing is explained according to respective steps with reference to the flowchart of FIG. 6.

(Step SC01)

Operation of the machining program is started and the adjustment value E of the machine is preset. As this adjustment value, a value appropriate for the machining program is selected. When such an appropriate value is not clear, it is set as E=1.

(Step SC02)

Measurement is performed at the predetermined measurement place and the measurement result (measurement value) is stored as A. This measurement can be performed in any method.

(Step SC03)

The thermal displacement correction amount is stored as F.

(Step SC04)

The actual thermal displacement amount D is calculated from the measurement value A which is actually measured and the thermal displacement correction amount F (using the expression, D=A+F).

(Step SC05)

The ratio r (=D/F) of the actual thermal displacement amount D to the thermal displacement correction amount F is calculated. It should be noted that r=E (the adjustment value for the existing thermal displacement at the time point of this measurement) when F=0.

(Step SC06)

The coefficient a is calculated using r=a+k|F| (k is a coefficient calculated in the aforementioned first step). The coefficient a thus calculated is stored in association with the machining program.

Figure 7:
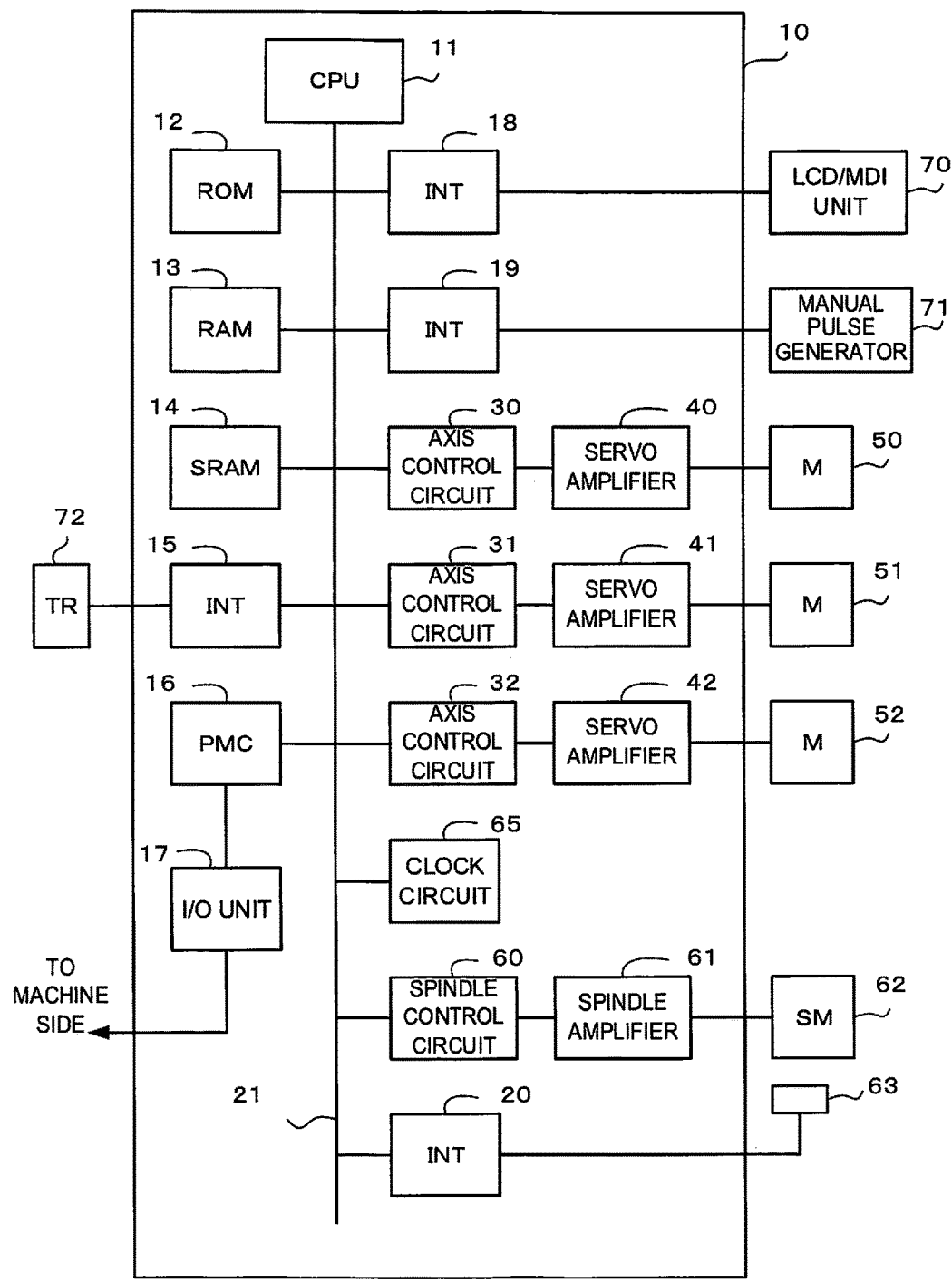
FIG. 7 is a block diagram for explaining an overview of a numerical controller that controls a machine tool.
Figure 8:
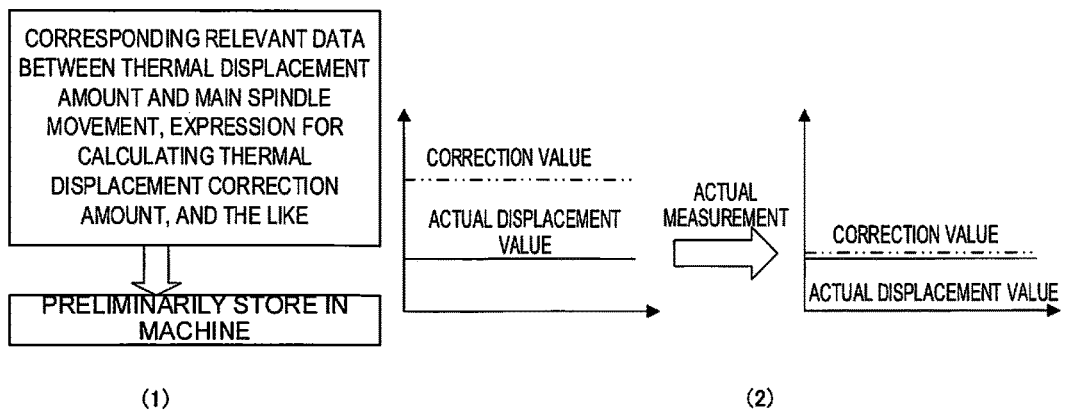
FIG. 8 is a diagram for explaining a conventional art.
Figure 9:
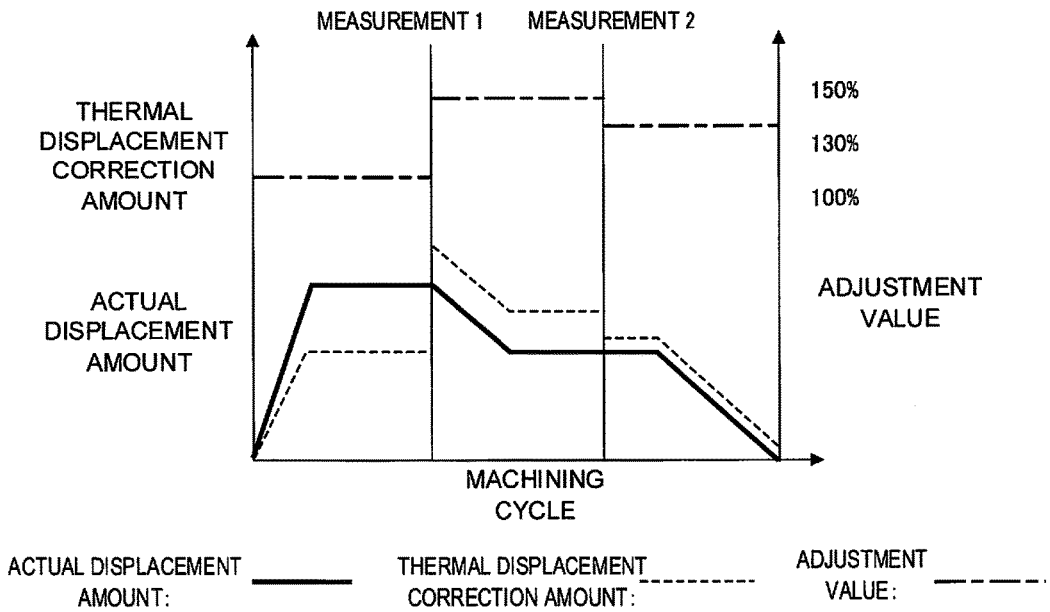
FIG. 9 is a diagram for explaining that it is necessary to suspend a machining cycle to carry out measurement in order to change the adjustment value according to an external environment and a machining situation in the conventional art.

FIG. 7 is a block diagram for explaining an overview of a numerical controller that controls a machine tool.

A thermal displacement correction apparatus for a machine tool according to the present invention is constituted of a numerical controller 10 that controls the machine tool. A processor (CPU) 11 of the numerical controller 10 is a processor that totally controls the numerical controller 10. The processor 11 reads out a system program stored in a ROM 12 via a bus 21 and totally controls the numerical controller 10 according to the system program. An LCD/MDI unit 70 is a manual data input device equipped with a liquid crystal display (LCD). In a RAM 13, temporary calculation data and display data, various kinds of data inputted by an operator via the LCD/MDI unit 70, and the like are stored.

An SRAM 14 is backed up by a battery (not shown), is configured as a non-volatile memory in which the storage state is held even when the power supply of the numerical controller 10 is turned off, and stores a program for measuring the initial position, a program for performing thermal displacement correction of the machine tool, machining programs which are read via an interface 15 and mentioned later, machining programs inputted via the LCD/MDI unit 70, and the like. Moreover, in the ROM 12, various system programs for performing a process of an edit mode required for creating and editing the machining programs and a process for automatic operation are written beforehand.

The interface 15 is an interface for an external device connectable to the numerical controller 10, and an external device 72 such as an external storage apparatus is connected to the interface 15. From the external storage apparatus, the machining programs, a thermal displacement measurement program and the like are read. A programmable machine controller (PMC) 16 controls an auxiliary apparatus and the like on the machine tool side with sequence programs embedded in the numerical controller 10. That is, signals needed on the auxiliary apparatus side are converted with these sequence programs and outputted to the auxiliary apparatus side from an I/O unit 17 according to the M function, S function and T function commanded by the machining program. The auxiliary apparatus including various actuators and the like is actuated according to the output signals. Moreover, signals from various switches and the like on an operation panel installed in the main body of the machine tool are received, are subject to necessary processes, and are sent to the processor 11.

Image signals for current positions of the axes of the machine tool, alarming, parameters, image data and the like are sent to the LCD/MDI unit 70 and displayed on its display screen. The LCD/MDI unit 70 is a manual data input device including a display, a keyboard and the like. From the keyboard of the LCD/MDI unit 70, an interface 18 receives data, which is sent to the processor 11.

An interface 19 is connected to a manual pulse generator 71. The manual pulse generator 71 is mounted on an operation panel of the machine tool and used for precisely positioning movable units of the machine tool through control of the axes with a distribution pulse based on manual operation. Axis control circuits 30 and 31 for the X- and Y-axes and a control circuit 32 for the Z-axis with which a table T of the machine tool is moved receive motion commands for the axes from the processor 11, and output the commands for the axes to servo amplifiers 40 to 42. The servo amplifiers 40 to 42 receive the commands and drive servomotors 50 to 52 of the axes of the machine tool. Position detectors are mounted on the servomotors 50 to 52 of the axes, and position signals from the pulse coders are fed back as a pulse sequence.

A spindle control circuit 60 receives a main spindle rotation command to the machine tool and outputs a spindle speed signal to a spindle amplifier 61. The spindle amplifier 61 receives the spindle speed signal and causes a main spindle motor 62 of the machine tool to rotate at the commanded rotational speed and drive a tool. A position detector 63 is coupled to the main spindle motor 62 through gears, a belt or the like. The position detector 63 outputs a feedback pulse in synchronization with the rotation of the main spindle, and the feedback pulse is read by the processor 11 via an interface 20. Reference numeral 65 denotes a clock apparatus which is adjusted to be synchronized with the current time.

The numerical controller 10 has a thermal displacement correction unit, for example, disclosed in Japanese Patent Application Laid-Open No. 11-90779 or Japanese Patent Application Laid-Open No. 2002-18677, which estimates the thermal displacement amount based on the operation of the machine or the temperatures of respective parts of the machine and corrects the thermal displacement by adding, to the position command value of the feed axis, the thermal displacement correction amount for canceling the thermal displacement amount thus estimated. Such a thermal displacement correction unit is conventionally known as disclosed, for example, in Japanese Patent Application Laid-Open No. 11-90779 and Japanese Patent Application Laid-Open No. 2002-18677, and hence, not described here in detail. The numerical controller 10 includes a measurement unit disclosed in Japanese Patent Application Laid-Open No. 11-90779 and can measure the actual position in the machine. The numerical controller 10 further includes software for performing the processes in the flowcharts illustrated in FIG. 4, FIG. 5 and FIG. 6, and thereby, constitutes the thermal displacement correction apparatus of the present invention.

The invention claimed is:

1. A controller for a machine tool, the controller comprising:
   a thermal displacement correction unit that estimates a thermal displacement amount from an operation of a machine of the machine tool or a temperature of each portion of the machine and calculates a thermal displacement correction amount for correcting thermal displacement by adding, to a position command value of a feed axis of the machine tool, the thermal displacement correction amount for cancelling the thermal displacement amount thus estimated;
   a thermal displacement correction amount adjustment unit that acquires information of an actual position in the machine by a measurement unit and adjusts the thermal displacement correction amount with an adjustment value;
   a machine-dependent coefficient calculation unit that calculates a machine-dependent coefficient depending on specifications of the machine for calculating the adjustment value on the basis of
      the thermal displacement correction amount that has been calculated in driving the machine,
      the actual position in the machine that is measured by the measurement unit, and
      an approximate expression representing a relation between the thermal displacement correction amount and the adjustment value;
   a machining condition-dependent coefficient calculation unit that calculates a machining condition-dependent coefficient, which is a numerical value specified depending on a machining program, for calculating the adjustment value on the basis of
      the thermal displacement correction amount that has been calculated in machining a workpiece on the basis of the machining program,
      the actual position in the machine that is acquired by measurement by the measurement unit, and
      the approximate expression representing the relation between the thermal displacement correction amount and the adjustment value; and
   a calculation unit that calculates the adjustment value corresponding to the estimated thermal displacement amount, from the approximate expression that contains the calculated machine-dependent coefficient and the calculated machining condition-dependent coefficient, wherein
   the thermal displacement correction amount adjustment unit corrects the thermal displacement correction amount with the calculated adjustment value, and
   the controller is configured to
      add the corrected thermal displacement correction amount is added to the position command value so as to obtain a corrected position command value, and
      control the feed axis of the machine tool using the corrected position command value.

2. The controller according to claim 1, wherein the approximate expression is preliminarily stored in the machine on the basis of machining experiment data.

3. The controller according to claim 1, wherein the approximate expression is obtained based on an expression, $E=a+k|F|$, where E is the adjustment value,
   a is the machining condition-dependent coefficient,
   k is the machine-dependent coefficient, and
   F is the thermal displacement correction amount.

4. The controller according to claim 3, wherein the value of E is within a range between 0.01 and 10.

5. The controller according to claim 3, further comprising a memory in which the coefficient k is preliminarily stored.

* * * * *